United States Patent [19]
Toda

[11] Patent Number: 5,005,198
[45] Date of Patent: Apr. 2, 1991

[54] CORDLESS TELEPHONE APPARATUS

[75] Inventor: Manabu Toda, Hiroshima, Japan

[73] Assignee: Sharp Kabushiki Kaisha, Osaka, Japan

[21] Appl. No.: 377,960

[22] Filed: Jul. 11, 1989

[30] Foreign Application Priority Data

Jul. 11, 1988 [JP] Japan ................................ 63-173360

[51] Int. Cl.⁵ ............................................ H04M 11/00
[52] U.S. Cl. ........................................ 379/58; 379/61; 379/62; 379/63; 455/127; 455/343
[58] Field of Search ...................... 379/58, 62, 63, 61; 455/127, 343

[56] References Cited

U.S. PATENT DOCUMENTS

| | | | |
|---|---|---|---|
| 4,375,701 | 3/1983 | Hanson | 455/127 |
| 4,562,307 | 12/1985 | Bursztejn et al. | 455/343 |
| 4,723,304 | 2/1988 | Maeda | 379/63 |
| 4,726,052 | 2/1988 | Kato et al. | 455/127 |
| 4,766,580 | 8/1988 | Go et al. | 455/127 |
| 4,794,649 | 12/1988 | Fujiwara | 455/38 |
| 4,852,147 | 7/1989 | Suzuki et al. | 455/127 |

FOREIGN PATENT DOCUMENTS 8702848 5/1987 World Int. Prop. O. .......... 455/127

OTHER PUBLICATIONS

European Patent Application 218,482 to Kato et al. Dated 3/10/86.
PCT Published International Aplication No. WO87/02848 to Schaefer et al. Dated May 7, 1987.

Primary Examiner—Reinhard J. Eisenzopf
Assistant Examiner—Kinfe-Michael Negash

[57] ABSTRACT

A cordless telephone includes a portable unit having chargeable secondary batteries as a power source in which to minimize the power consumption, signals are received intermittently to limit the operating time of the built-in receiver. The portable unit includes a detecting device for detecting the charging state of the secondary battery, and swtiching device for switching the receiving action of receiver to a continuous receiving action while the charging state of the secondary battery is being detected by the battery charging detecting device. Accordingly, the power source of the receiver, while the secondary batteries are being charged is fed from the power source for charging through the secondary batteries. Thus, the receiving action during this period may be set in continuous receiving action. Hence, it is possible to reply from the portable unit without delay to a call from a base unit during the charging.

11 Claims, 4 Drawing Sheets

CORDLESS TELEPHONE APPARATUS

BACKGROUND OF THE INVENTION

1. Field of the Invention

This invention relates to a cordless telephone apparatus having a base unit and a portable unit connected through radio communications more particularly it relates an improvement of a portable unit for intermittent receiving.

2. Description of the Prior Art

Generally, the portable unit of a cordless telephone apparatus includes a secondary battery which can be charged as a power source. Therefore, to minimize the consumption, it is designed to receive signals intermittently to limit the operating time of the built-in receiver. For example, an intermittent reception of receiving for 100 msec and pausing for 900 msec is repeated. When there is a call from the base unit, it is designed to detect during the 100 msec receiving action.

In such intermittent receiving action, however, if there is a call from the base unit right after the 100 msec receiving action, a maximum no-response time of 900 msec occurs. This aroused dissatisfaction among the users. This problem may be solved by operating the receiver of the portable unit in continuous receiving action. However, this will accelerate the consumption of the secondary battery, and the battery must be exchanged frequently.

SUMMARY OF THE INVENTION

This invention is devised in light of the above-discussed background. The cordless telephone apparatus of the invention includes a base unit and a portable unit for communicating with each other by radio communications. The portable unit is powered by a rechargeable secondary battery and the internal receiver is designed to receive intermittently. It further comprises, in the portable unit, a device for detecting the charging state of the secondary battery and a device for changing over the receiving action to of the receiver for a continous receiving action while the charging state of the secondary battery is being detected by the charging detecting device.

In other words, the receiving action of the portable unit is set in continuous receiving action during charging of the secondary battery, and in intermittent receiving action in non-charging time. Accordingly, the power of the receiver while the secondary battery is being charged is fed from the power source for charging through the secondary battery. This is that the receiving action in this period may be set in continuous receiving action.

As described herein, according to the cordless telephone apparatus of the invention, since the receiver can be set in the continuous receiving mode while the secondary battery is being charged, it is possible to reply from the portable unit without delay, to a call from the base unit, during charging.

The cordless telephone apparatus according to another aspect of the invention, includes a base unit connected to a telephone line and a portable unit transferring information with the base unit by radio communications. The portable unit includes a secondary battery contained therein for supplying a power thereto.

The base unit generates a calling signal.

The portable unit includes a receiver for receiving the calling signal and is powered by the secondary battery.

A device for detecting the charging state of the secondary battery is further included.

Finally, a device is included, in response to the output from the battery charging detecting device, for controlling to the performance of a receiving action, consecutively by supplying a power to the receiver while the battery is being charged and the performance of an intermittent receiving action with a power of the secondary battery while the battery, is not being charged.

In a preferred embodiment, in the portable unit, the secondary battery is charged via a diode.

The battery charging detecting device detects voltage of the side of a power source for charging from the diode and detects whether electric power for battery charging is supplied from the power source for charging or not.

In another preferred embodiment, the controlling device:

Includes a switching element disposed between the secondary battery and the receiver.

It further includes a circuit for generating a timing signal performing an oscillation action at a predetermined frequency and a circuit in response to the output from the battery charging detecting device and the output from the timing signal generating circuit, for controlling the switching element to remain in continuity while the secondary battery is being charged and to make an intermittent continuity/interruption state while the battery is not being charged, corresponding to the timing signal.

In still another preferred embodiment, a manual electric power switch is disposed between the secondary battery and the switching element.

BRIEF DESCRIPTION OF THE DRAWINGS

These and other objects of the invention, as well as the features and advantages thereof, will be better understood and appreciated from the following detailed description taken in conjunction with the drawings, in which.

DETAILED DESCRIPTION OF THE PREFERRED EMBODIMENT

Figure 1:
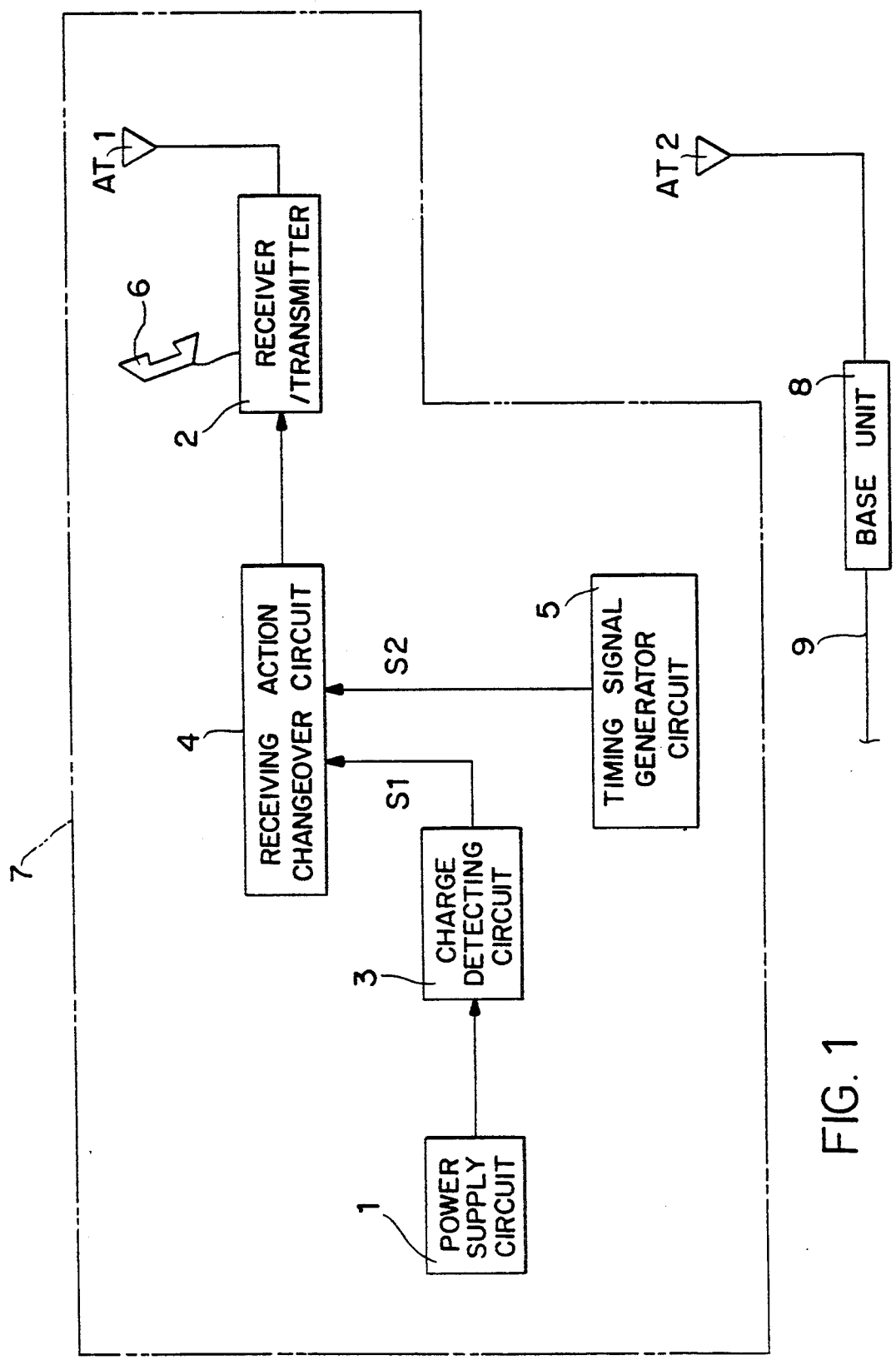
FIG. 1 is a schematic block diagram of a portable unit 7 in a cordless telephone apparatus of the invention.

Referring now to the drawings, a preferred embodiment of the invention is described in details below.

One of the embodiments of the invention is described below while referring to the drawings.

FIG. 1 is a schematic block diagram of a portable unit 7 of a cordless telephone apparatus of the invention.

In the diagram, numeral 1 denotes a power supply circuit, 2 is a receiver/transmitter for performing intermittent reception, 3 is a charging detecting circuit for detecting the charging state of the power supply circuit 1, 4 is a receiving action changeover circuit for changing the receiving action of the receiver/transmitter 2 from intermittent reception to continuous reception, and 5 is a timing signal generator circuit for generating a timing signal for controlling the timing of intermittent reception of the receiver/transmitter 2.

The receiver/transmitter 2 is provided with a hand set 6 including a microphone and a speaker, and an antenna AT1. The receiver/transmitter 2 transfers information with a base unit 8, for example by electromagnetic waves. Transmitting and receiving of electromagnetic waves is performed via the antenna AT1. The base unit 8 is connected to a telephone line 9, and information is transferred with a portable unit 7 by electromagnetic waves. Transmitting and receiving of electromagnetic waves is performed via an antenna AT2.

Figure 2:
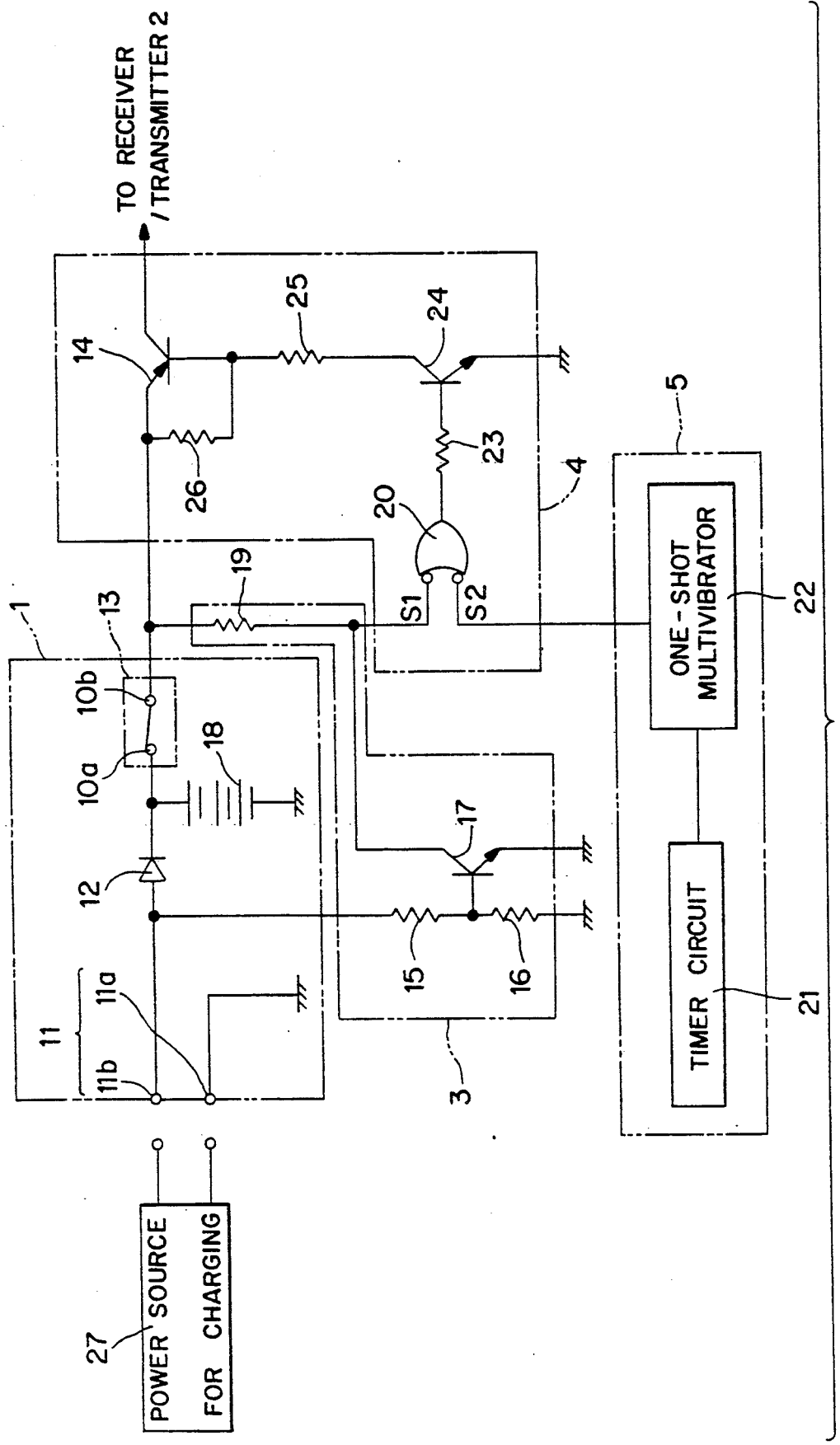
FIG. 2 is a circuit diagram showing an example of a more practical electric constitution of the portable unit 7.

FIG. 2 shows a more practical circuit composition of the portable unit 7 stated above.

In the diagram, one terminal 11a of charging terminals 11 is connected to the earth potential. The other terminal 11b is connected to terminal 10a of a power switch 13 through a reverse current preventive diode 12. Terminal 10b of the power switch 13 is connected to a receiver/transmitter 2 by way of a transistor 14 which is a switching element. Further, it is also connected to one of the input terminals of an OR circuit 20 of negative logic input. A secondary battery 18 is connected between the cathode terminal of the reverse current preventive diode 12 and the earth potential. Resistances 15, 16 are connected in series between the anode terminal of the reverse current preventive diode 12 and the earth potential. Further, base terminal of a transistor 17 is connected between these resistances 15, 16. A collector terminal of this transistor 17 is connected between the resistance 19 and OR circuit 20, and its emitter terminal is connected to the earth potential. To the other input terminal of the OR circuit 20, an intermittent reception signal S2, created by a timer circuit 21 and a one-shot multivibrator 22, are applied. The output terminal of the OR circuit 20 is connected to the base terminal of a transistor 24 by way of a resistance 23, the emitter terminal of the transistor 24 is connected to the earth potential and the collector terminal is connected to the base terminal of the transistor 14 through a resistance 25.

In such a composition, the power supply circuit 1 is composed of charging terminals 11, reverse current preventive diode 12, secondary battery 18, and manual electric power switch 13. The charging detecting circuit 3 is composed of the resistance 15, 16, transistor 17 and resistance 19. The receiving action changeover circuit 4 is composed of the OR circuit 20, resistance 23, 25, 26, and transistors 14, 24. The timing signal generator circuit 5 is composed of the timer circuit 21 and one-shot multivibrator 22.

The operation of thus composed portable unit 7 is explained below.

The power supply circuit 1, during charging, receives a voltage from a power source for charging 27 at the charging terminals 11 to charge the secondary battery 18. When not charging, the charging terminals 11 are open, and the secondary battery 18 is separated from the charging terminals 11 by the function of the reverse current preventive diode 12.

Figure 3:
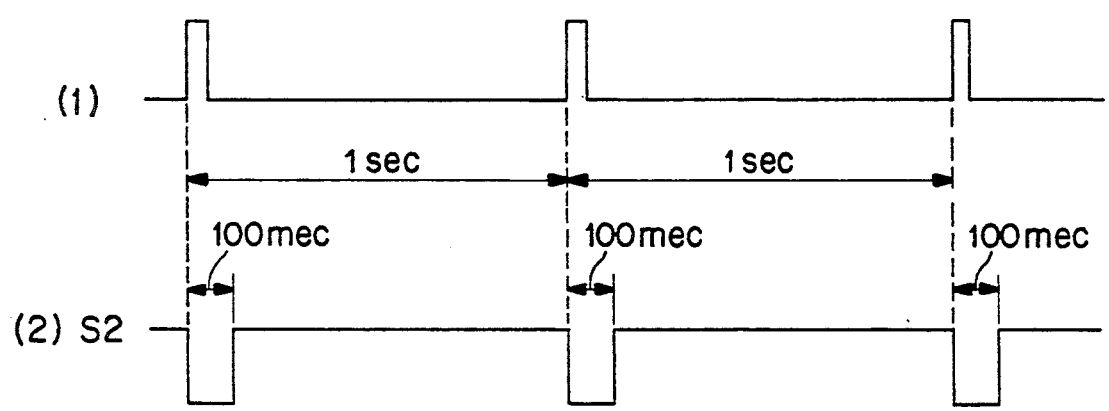
FIG. 3 is a timing chart showing an operation of a timing signal generating circuit 5.
Figure 4:
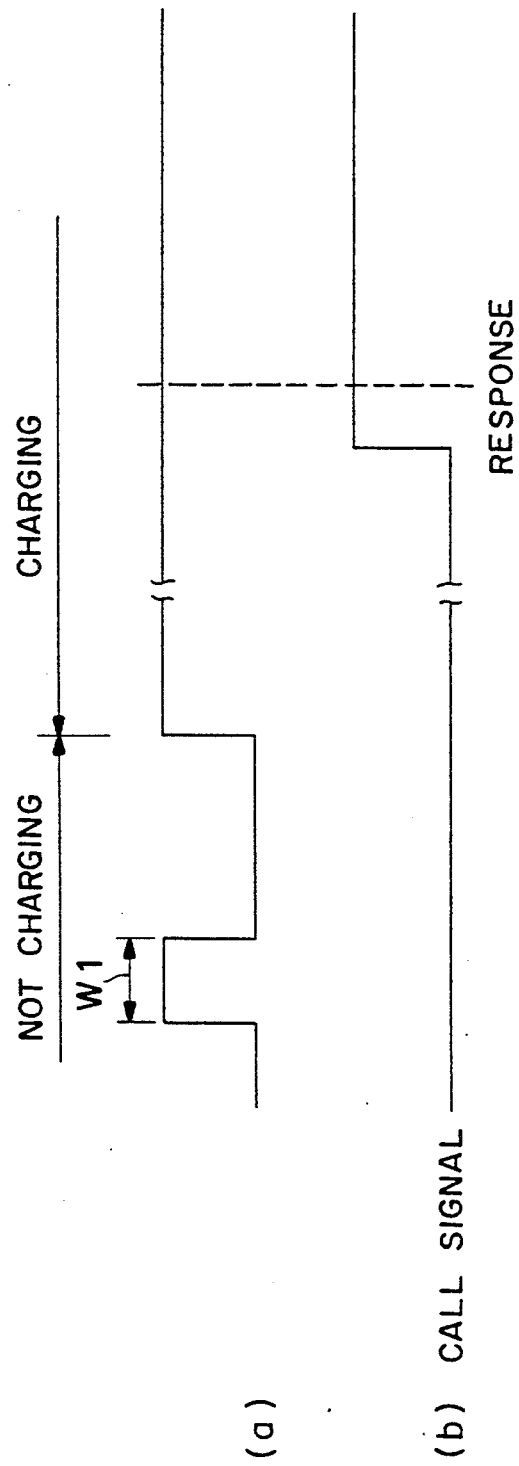
FIG. 4 is a timing chart showing an operation of the portable unit 7.

During charging, therefore, an electric current flows into the resistance 15 and transistor 17 from the power source for charging 27 through the charging terminals 11, and the transistor 17 is turned ON state. Consequently, a charge detection signal S1 applied to one input terminal of the OR circuit 20 becomes active (logic 0). On the other hand, as shown in FIG. 3(1), the timer circuit 21 outputs trigger pulses at intervals of 1 sec. By these trigger pulses, as shown in FIG. 3(2), the one-shot multivibrator 22 turns (logic 0) the intermittent reception signal S2 active for only 100 msec in every 1 sec. It is then applied to the other input terminal of the OR circuit 20. In this case, at the output terminal of the OR circuit 20, regardless of the intermittent reception signal S2, a signal of high level is always output. Further, the transistors 24 and 14 are always in an ON state, as shown in FIG. 4(a), and the receiver/transmitter 2 is always in an ON state. That is, the continuous receiving action mode is established. In this case, therefore, as shown in FIG. 4, the portable unit 7 can reply to a call from the base unit 8 without delay.

Meanwhile, when the charging current from the power source for charging 27 is increased by the portion of the current necessary for the operation of the receiver/transmitter 2, the consumption of the secondary battery 18 during charging may be prevented.

While not charging, on the other hand, the transistor 17 is in the OFF state, and the charge detection signal S1 becomes logic 1 by the resistance 19. As a result, at the output terminal of the OR circuit 20, only when the intermittent reception signal S2 is applied, a signal of high level is output. Then the transistors 24 and 14 are turned to the, ON state and the voltage of the secondary battery 18 is applied to the receiver/transmitter 2. Thus the receiver/transmitter 2 is set in reception mode only in this period W1, as shown in FIG. 4(a). In this embodiment, the period W1 is 100 msec. That is, it is the same intermittent receiving action as in the conventional systems.

The invention may be embodied in other specific forms without departing from the spirit or essential characteristics thereof. The foregoing embodiment is therefore to be understood as illustrative in all respects, and the scope of the invention is indicated by the appended claims, rather than by the foregoing description.

Furthermore, all changes and modifications which come within the meaning and range of equivalency of the claims are therefore indended to be embranced therein.

What is claimed is:

1. A cordless telephone apparatus including a base unit and a portable unit for transferring information between the base and portable unit by radio communications, the portable unit being powered by a rechargeable secondary battery and further including an internal receiver operating in an intermittent receiving action, the portable unit comprising:

detecting means for detecting when the secondary battery is being charged; and switching means for switching the receiving action of the receiver to a continuous receiving action of continual power supply from an external power source, from the intermittent receiving action, when the secondary battery is being charged, as detected by the detecting means.

2. A cordless telephone apparatus including a base unit connected to a telephone line and a portable unit for transferring information with the base unit by radio communications, the portable unit including a secondary battery for supplying power thereto, the apparatus comprising:

means associated with the base unit for generating a calling signal;

the portable unit including a receiver for receiving the generated calling signal, said receiver being powered by the secondary battery;

detecting means for detecting when the secondary battery is being charged;

controlling means, responsive to an output from the detecting means, for controlling performance of a continuous receiving action of the receiver by continually supplying power to the receiver when the battery is being charged and for controlling performance of an intermittent receiving action of the receiver by intermittently supplying power from the secondary battery when the battery is not being charged.

3. The cordless telephone apparatus of claim 2, wherein, in the portable unit, the secondary battery is charged via a diode, and the detecting means detects voltage of a power source for charging from the diode and detects whether electric power for secondary battery charging is being supplied from the power source.

4. The cordless telephone apparatus of claim 2, wherein the controlling means comprises:

a switching element disposed between the secondary battery and the receiver;

timing means for generating a timing signal performing an oscillation at a predetermined frequency; and a circuit, responsive to the output from the detecting means and the signal generated from the timing means, for controlling the switching element to remain closed for continuous receiving action when the secondary battery is being charged and to intermittently open and close the switching element for intermittent receiving action when the battery is not being charged, in synchronization with the generated timing signal.

5. The cordless telephone apparatus of claim 4 wherein a manual electric power switch is disposed between the secondary battery and the switching element.

6. A cordless telephone apparatus including a base unit and a portable unit, the base unit being connected to telephone lines to receive communication signals and transmit a calling signal to the protable unit via radio communications, the portable unit comprising:

receiving means for receiving the calling signal;

rechargeable battery means, operatively connected to said receiving means, for intermittently supplying power, to said receiving means, during predetermined intervals of time;

detection means, operatively connected to said rechargeable battery means, for detecting when the rechargeable battery means is being charged;

switching means, operatively connected to said detection means and said receiving means, for switching the receiving means into a continuous receiving mode, where power is continuously supplied to the receiving means from an external power source, when the rechargeable battery means is being charged, as detected by the detection means.

7. The cordless telephone apparatus of claim 6 wherein the switching means further switches the receiving means into an intermittent receiving mode, wherein power is intermittently supplied to the receiving means from the rechargeable battery means during predetermined intervals of time, when the rechargeable battery means is not being charged, as detected by the detection means.

8. The cordless telephone apparatus of claim 7, the portable unit further comprising:

timing generation means, operatively connected to said switching means, for supplying intermittent signals during said predetermined periods of time during which said rechargeable battery means supplies power to said receiving means.

9. A method of operating a portable telephone in a continuous receiving mode, wherein power is continuously supplied to the portable telephone, during charging of a rechargeable battery contained therein and operating the telephone in an intermittent receiving mode, wherein power is supplied during intermittent intervals to the portable telephone, when the rechargeable battery is not being charged, comprising the steps of :

(a) charging the rechargeable battery through an external power source;

(b) determining when the rechargeable battery is being charged;

(c) switching the portable telephone to the continuous receiving mode when the rechargeable battery is being charged, based upon the determination of step (b); and (d) switching the portable telephone to the intermittent receiving mode when the rechargeable battery is not being charged, based upon the determination of step (b).

10. The method of claim 9, further comprising the steps of:

(e) generating intermittent signals during predetermined intervals of time; and (f) supplying power to the portable telephone during each said predetermined interval of time, from the recahrgeable battery, when the rechargeable battery is not being charged, based upon the determination of step (b).

11. The method of claim 10, further comprising the step of:

(g) supplying power to the portable telephone continuously, from the external source, when the rechargeable battery is being charged, based upon the determination of step (b).

* * * * *